(No Model.)
W. W. EMERSON.
FORMING TOOL.
No. 388,652. Patented Aug. 28, 1888.
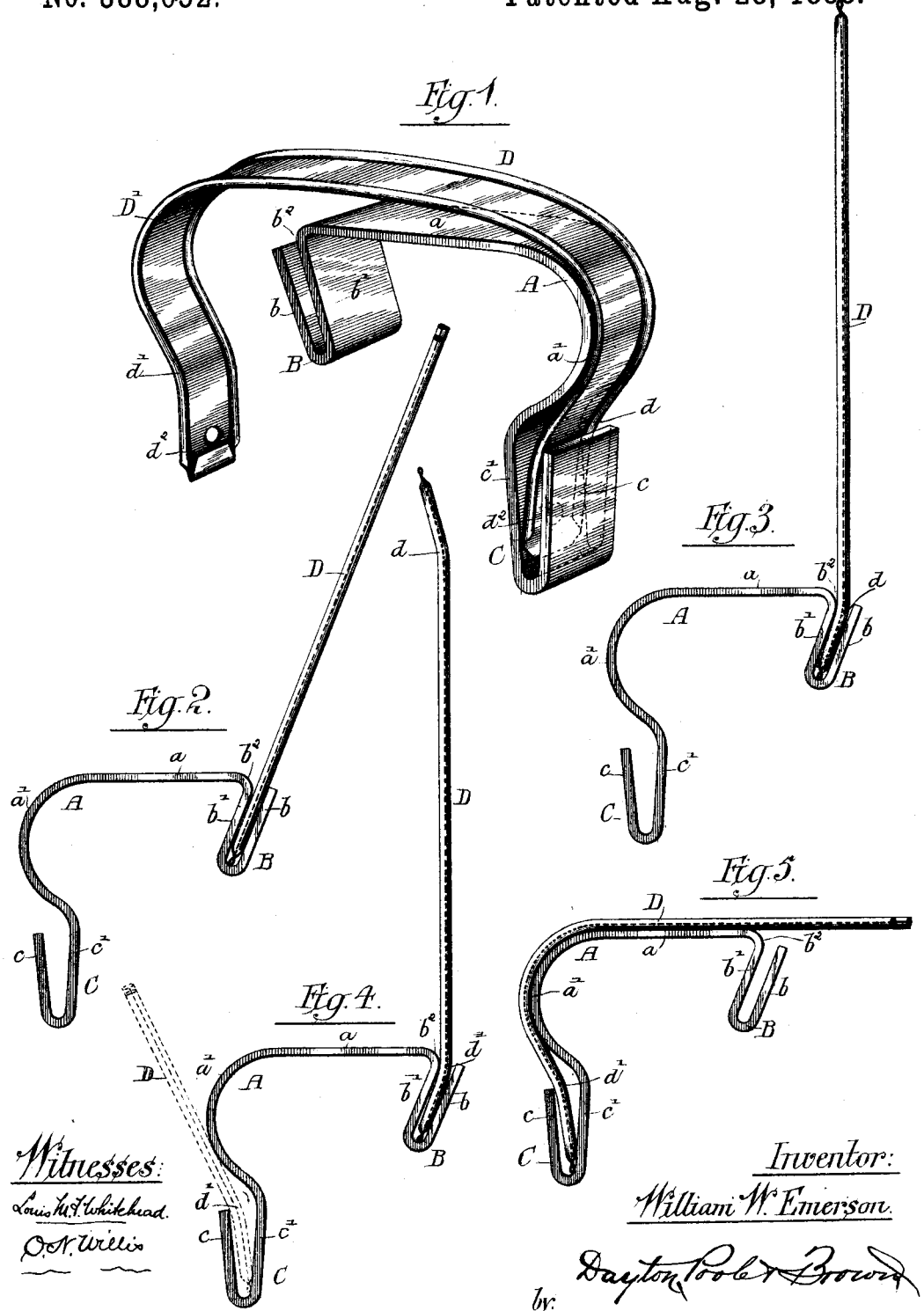
Witnesses:
Louis M. F. Whitehead.
O. N. Willis
Inventor:
William W. Emerson.
by Dayton Poole & Brown
Attorneys.

UNITED STATES PATENT OFFICE.

WILLIAM W. EMERSON, OF ASTORIA, ILLINOIS.

FORMING-TOOL.

SPECIFICATION forming part of Letters Patent No. 388,652, dated August 28, 1888.

Application filed April 21, 1888. Serial No. 271,443. (No model.)

*To all whom it may concern:*

Be it known that I, WILLIAM W. EMERSON, of Astoria, in the county of Fulton and State of Illinois, have invented certain new and useful Improvements in Forming-Tools; and I do hereby declare that the following is a full, clear, and exact description thereof, reference being had to the accompanying drawings, and to the letters of reference marked thereon, which form a part of this specification.

This invention relates to an implement more commonly employed by tinners for the purpose of forming bails or handles for vessels of various kinds.

The feature of novelty lies in the construction of an implement or tool whereby the material from which the bail is to be made may be bent or formed upon the same when the tool is held in the hand of the operator; and another feature of novelty lies in the fact that after the bail has been shaped over this implement or tool it requires no further shaping or finishing, but is ready for attachment to the vessel.

The invention will be more readily understood by reference to the accompanying drawings.

In Figure 1 I have shown a perspective view of my novel bail-forming tool with a completed bail in position upon said former. Figs. 2, 3, 4, and 5 each illustrate in a side view the bail-forming tool with the material from which the bail is made placed in position upon said former, showing the bail in the various stages of operation.

In the drawings, A is a metal (relatively narrow) bar constituting the implement or forming-tool, having a central flat portion, $a$. One end of the bar is bent downwardly and at an inclination to the flat portion $a$, as illustrated, to form a U-shaped part, socket, or vise, B, the latter comprising the side pieces, $b\ b'$, and the bent, rounded, or curved connection $b^2$. The opposite end of the implement terminates in a V-shaped part, socket, or vise, C, comprising the walls $c\ c'$, the latter being nearly at right angles with the flat part $a$, while the wall $c$ flares outwardly, as shown. The flat portion $a$ is bent downwardly and inwardly to form a rounded or curved portion or part, $a'$, the lower end of which connects with the socket C. The convex side of said rounded intermediate part, $a'$, is upon the same side of the bar A as the opening of the socket C.

D is a flat and relatively narrow strip of sheet metal or other suitable material from which the bail is to be constructed, and D' is the completed bail.

In practice the operator takes the forming-tool A in one hand, holding it somewhat in the position illustrated in Fig. 2, and inserts one end of the metal strip D in the socket B between the walls $b\ b'$ thereof. He then grasps the upper end of this strip D and bends the same toward the other end of the forming-tool A until the said strip D is in a vertical position, as illustrated in Fig. 3, thus producing a bend in said strip D at one end, as shown at $d$. Removing the strip D from the socket B, the operator reverses the same and inserts the other end of said strip in the socket B of the tool, and repeats the operation just described, forming the bend $d'$ in said strip, as clearly shown in Fig. 4. Removing the strip D from the socket B, he inserts one end thereof in the socket C, as shown in dotted lines in Fig. 4, bends said strip backward over the rounded convex portion $a'$, and presses the same down upon the flat portion $a$, as shown in Fig. 5, thus completing one-half of the bail. Again removing the now partially-formed bail, the operator reverses the same and inserts the other end of said strip D within the socket C, and repeats the operation just described, which latter operation completes the bail, as illustrated in Fig. 1. The bail D' is then removed and another strip D inserted in the socket B, and operation repeated.

The angle of inclination of the socket B with reference to the straight portion is such that the strip D bent therein, as described, may be readily inserted in the socket C, as shown in Fig. 4. The amount of flare given to the part $c$ of the socket C is such that the points of bearing in said socket do not alter the form of the bend $d$ when the strip is bent in the opposite direction over the convex portion $a'$ of the tool A, thus preserving the two ends $d^2\ d^2$ of the bail D' parallel for easy attachment to a kettle or other vessel.

I preferably make the tool A a trifle wider than the width of the bail to be formed thereon; but this of course is not essential, as it is perfectly apparent that a wire bail may be shaped or formed upon the same implement and in the same manner as a strip of flat metal is formed.

One of the particular advantages of my invention is the fact that all the bails constructed upon it are of one uniform size and shape, and another feature of the invention is the fact that the bail may be shaped and constructed upon the tool by the operator by hand only, and that such construction does not require the use of a mallet, hammer, rule, compass, vise, or any other implement such as is required in the construction of bails now in use, thereby greatly increasing the rapidity with which these bails may be constructed and also materially lessening the cost of the same.

I claim as my invention—

The forming-tool described, comprising a curved metal bar, A, having its ends bent in opposite directions to form two sockets, B and C, the openings of said sockets being at the convex side of the bar, substantially as described.

In testimony that I claim the foregoing as my invention I affix my signature in presence of two witnesses.

W. W. EMERSON.

Witnesses:
H. O. CUMMINGS,
G. F. COUNCILMAN.